United States Patent
Degen et al.

[11] 3,908,484
[45] Sept. 30, 1975

[54] DIVIDING HEAD

[76] Inventors: Frederick I. Degen, Center St., Leonardsville, N.Y. 13364; Gregory R. Waldron, Loomis Rd., Liberty, N.Y. 12754

[22] Filed: Mar. 22, 1973

[21] Appl. No.: 344,049

[52] U.S. Cl. .............. 74/813 R; 33/1 D; 74/813 L; 90/57; 279/5
[51] Int. Cl.² .................. B23B 29/30; B23Q 17/04
[58] Field of Search .. 74/826, 813 L, 813 R, 813 C; 33/1 D; 90/57; 279/5

[56] References Cited
UNITED STATES PATENTS

| | | | |
|---|---|---|---|
| 2,452,089 | 10/1948 | Wiken et al. | 74/813 L |
| 2,452,544 | 11/1948 | Brodie | 33/1 D |
| 2,921,487 | 1/1960 | Schabot | 74/826 X |
| 3,146,640 | 9/1964 | Moncrieff | 74/826 |
| 3,246,543 | 4/1966 | Davidson et al. | 74/826 |
| 3,252,358 | 5/1966 | Moncrieff | 74/826 X |

*Primary Examiner*—Samuel Scott
*Assistant Examiner*—F. D. Shoemaker
*Attorney, Agent, or Firm*—Kenyon & Kenyon Reilly Carr & Chapin

[57] ABSTRACT

An apparatus and method for rotationally moving and positioning a work piece such as for dividing the workpiece into a predetermined number of equal segments. The movement is accomplished by repeatedly angularly displacing the work piece over a given swing increment of angular movement. The angular swing increment is established by summing angular displacements of each of a plurality of circular plates, each plate divided into a different number of equal segments. By a proper choice of the number of segments into which the plates are divided, and of the number of segments each plate is displaced, the angular increment can be established with extremely high precision. The angular increment may be greater than the distance between adjacent intended segments into which the work piece is divided. This allows distribution of the error of the angular increment established for each movement of the work piece about the entire periphery of the work piece, minimizing the accumulation of error between any particular pair of segments into which the work piece is divided. Additionally, a spanner disc is provided for allowing additional angular movement of the work piece within a secondary angular increment on either side of positions achieved by means of the aforesaid angular increments. This apparatus and method can be employed in any application requiring precision indexed rotational position for any purpose.

15 Claims, 11 Drawing Figures

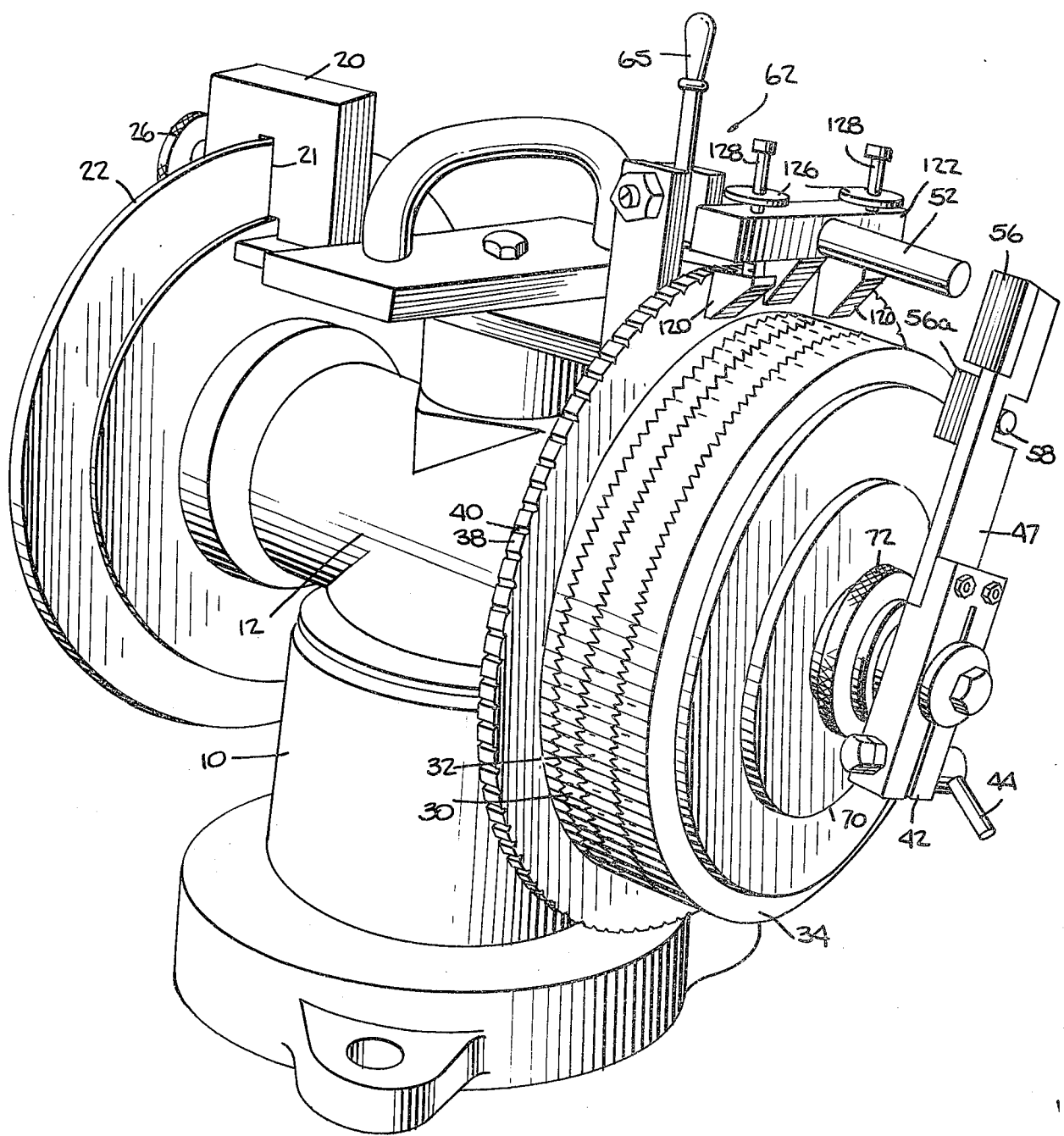

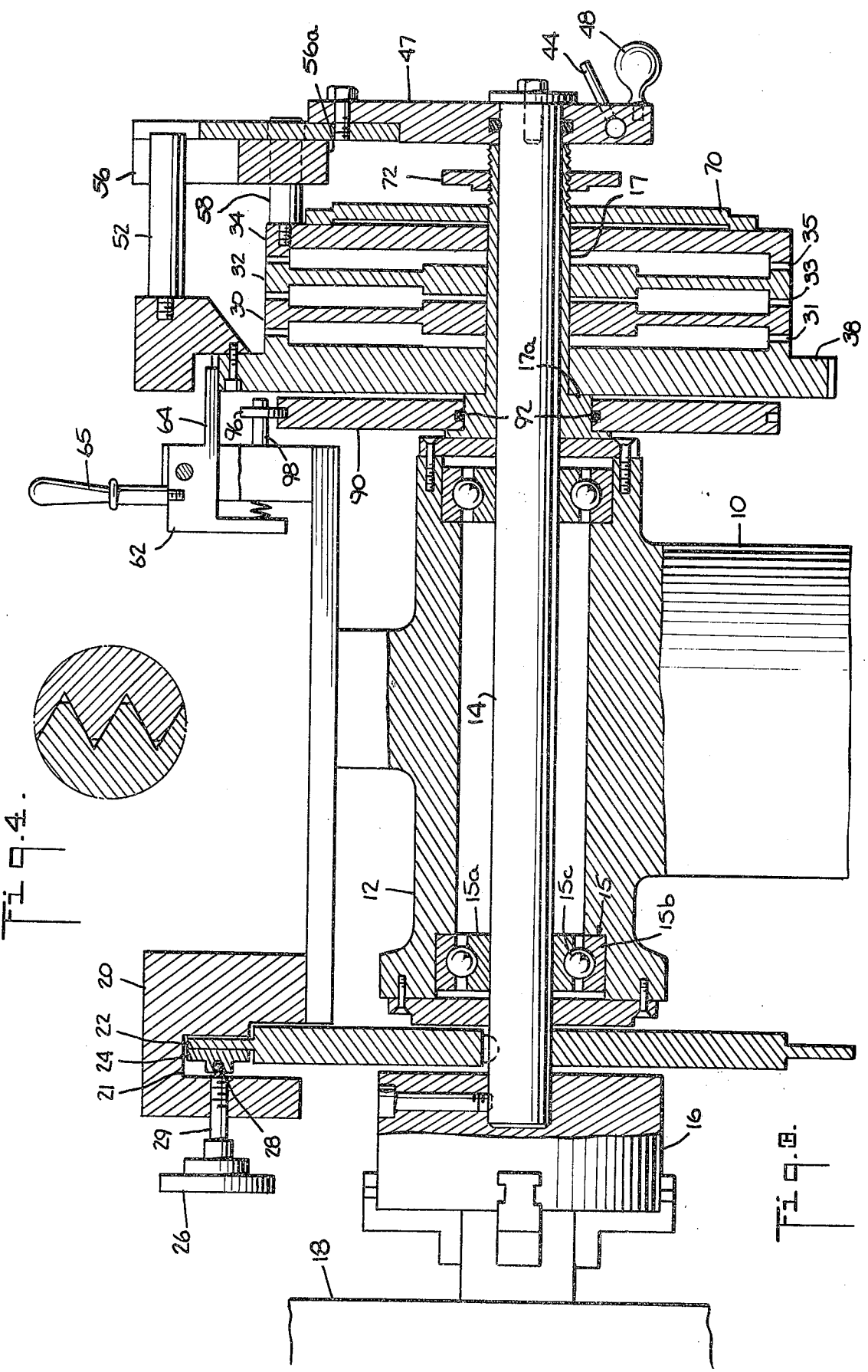

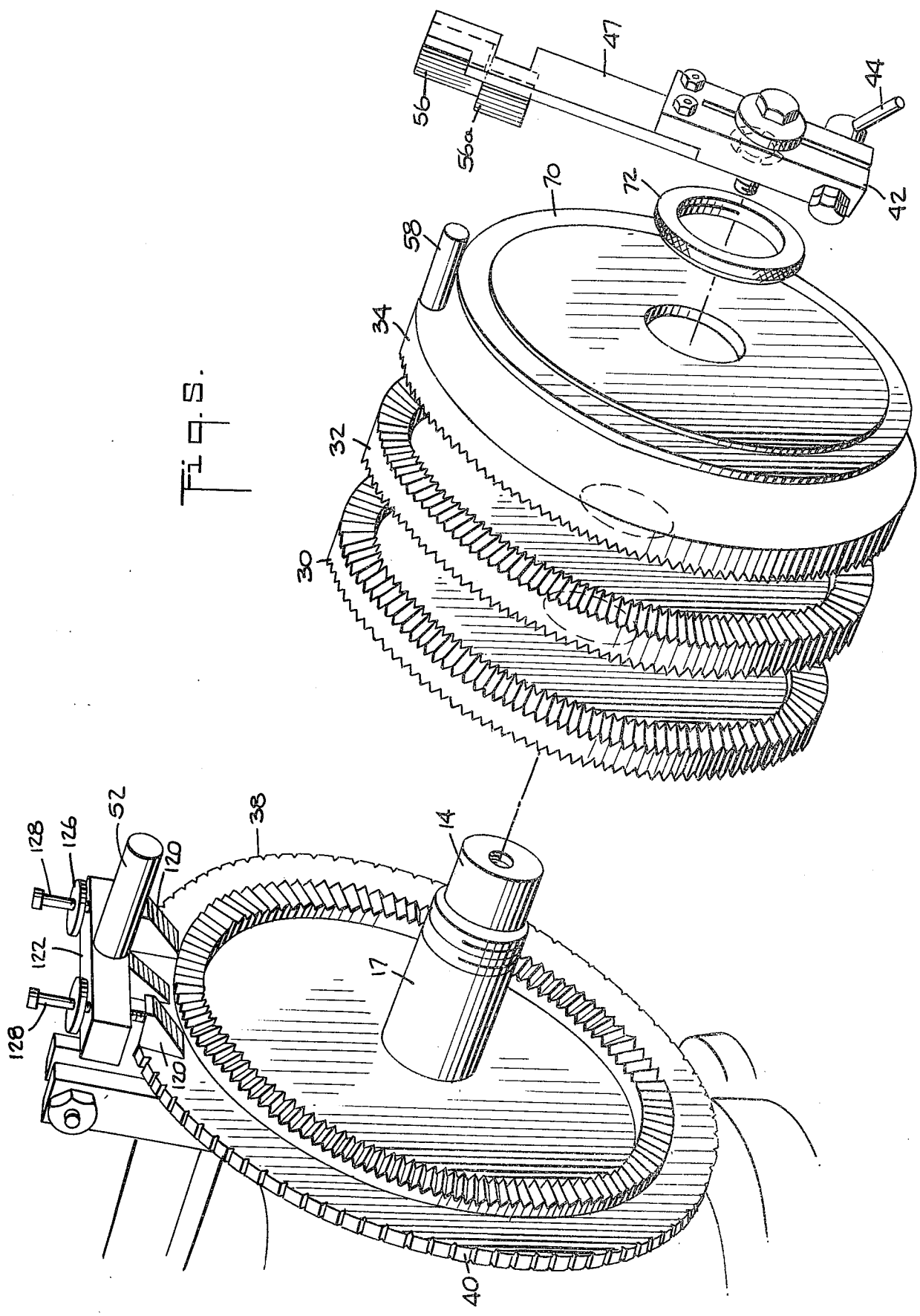

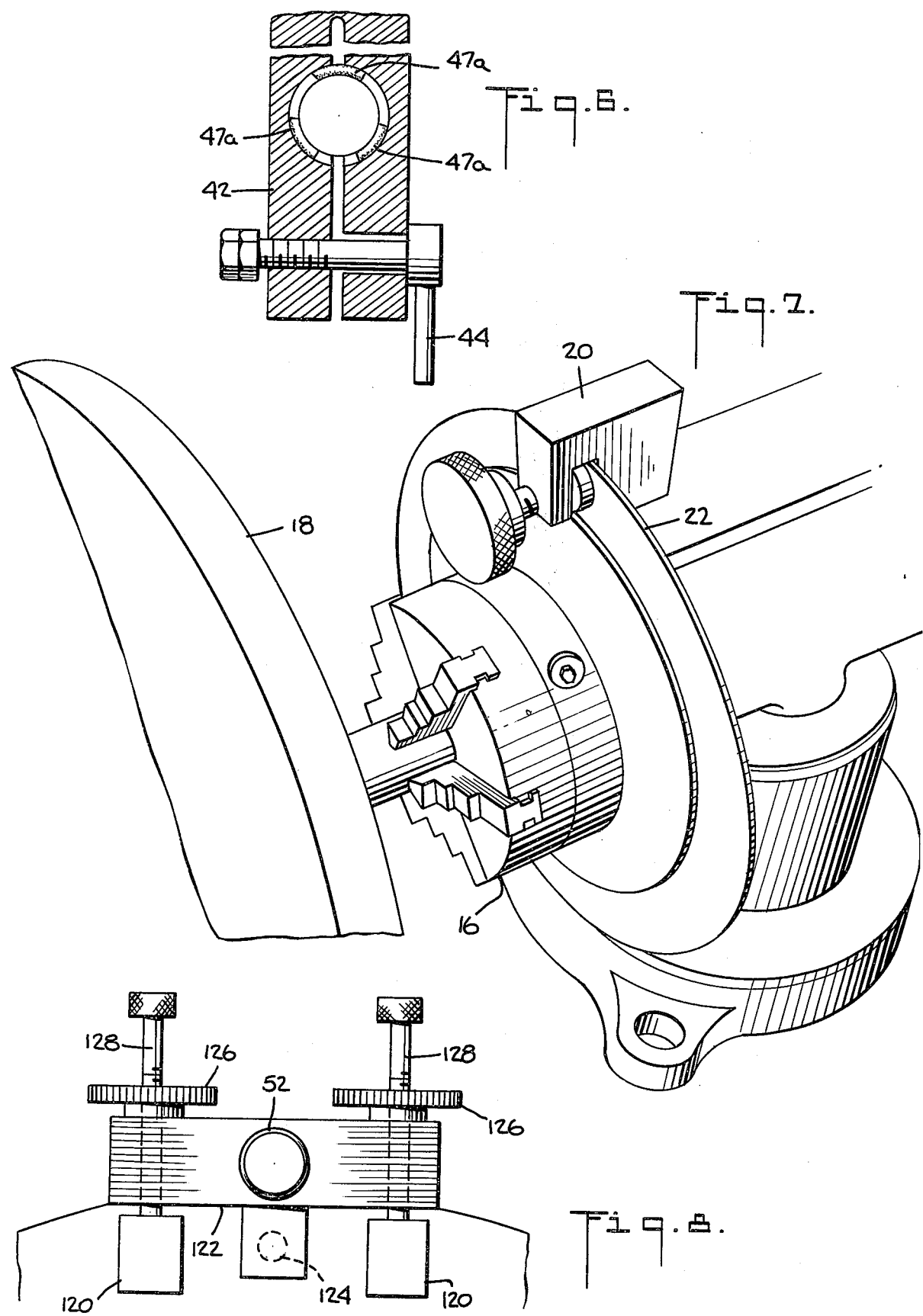

DIVIDING HEAD

BACKGROUND OF THE INVENTION

1. Field of the Invention

This invention is related to the art of dividing circular articles into any predetermined number of equal segments, within a range.

2. Description of the Prior Art

It is known to provide apparatus and method for dividing a circular workpiece into a predetermined number of equal portions. Two forms of such apparatus are exemplified in patents such as U.S. Pat. Nos. 2,677,315 and 2,567,936, each to Hansen.

In the former reference, a device is shown for rendering accurate rotational positioning by means of a plurality of plates, each bearing a circle of registration holes. Three plates are used, including circles of 80, 81 and 82 holes. By indexing the angular displacements between predetermined holes in the circles of holes, a very large number of different rotational increments can be established which are smaller than the increment between adjacent holes in any of the circles of holes. Further accuracy is sought by use of reduction gearing to rotate the workpiece.

This reference, however, employs circles having numbers of holes which have common factors. Hansen apparently failed to appreciate that the number of fineness of increments obtainable thereby is considerably more limited than if no common factors existed between the numbers of holes. This is demonstrated hereinbelow. Moreover, Hansen's gear reduction apparatus introduces backlash and play into the system, limiting accuracy, which becomes aggravated with use.

The latter reference discloses a dividing head utilizing a plate having spirally positioned holes for a vernier effect. These, however, require extremely intricate techniques to establish their location, and accuracy of such placement is, at best, limited. Also, the number of increments obtainable therewith is limited to a great degree.

Prior art devices exist which establish the incremented movement by relative positioning of a plurality of circular serrated plates which lock together in a limited number of desired rotational relations. Such an apparatus is shown in U.S. Pat. No. 2,921,487, to Schabot. Only one pair of plates is used, however, each bearing an equal number of serrations. This means that the number of possible relative positions of the plates is limited to the number of serrations. In Schabot, for example, only increments of one degree are possible, with his basic device.

Still other machines, such as Schabot, use gage blocks to enable achievement of small increments in rotation, such as minutes. The blocks are inconvenient to use, and, like reduction gearing, also introduce more error.

These machines and techniques have other disadvantages. Although some of the prior art machines are capable of accomplishing divisions with relatively high resolution, there is a constant demand for even greater fineness of resolution. This is true because apparatus of this type is generally used in the precision cutting of gear teeth and other machine parts, in which tolerances must be extremely small, in order to create machinery which is smooth running, accurate, and which possess good wear characteristics.

So far as is known to applicant, prior art machinery and methods for dividing circular elements inscribe the division indices on the elements successively, in either a clockwise or counter-clockwise direction. It is known that, in any dividing apparatus, the increment of angular swing which is established always deviates from its intended value. As a result, when these machines are used for tasks such as cutting gear teeth, the error in positioning of each index accumulates as each successive index is cut. This is manifested in the case of cutting gear teeth by the appearance of a thick or thin tooth at the end of the cutting sequence, and is obviously undesirable.

It is an object of this invention to provide a divider apparatus and method capable of operating with substantially greater accuracy and flexibility in the degrees of increments available, than is achievable with prior art techniques and mechanisms.

It is a further object of this invention to provide apparatus and method for minimizing the accumulation of error in placement of indices which are cut, such that the error, instead of accumulating, is distributed about the entire succession of indices, as much as possible.

It is a further object to provide apparatus and method whereby the work piece may be conveniently divided into any number of segments within a broad range.

It is an additional object to accomplish the above aims without the necessity for gage blocks or reduction gearing and with a minimum of moving parts in order to reduce the susceptibility of the machine to backlash and play.

SUMMARY OF THE INVENTION

This invention includes apparatus for rotationally mounting a shaft to which is affixed a circular work piece. Positioned on the shaft are three circular plates comprising three splined interfaces, by which the plates can be locked together in any of a number of angular relationships. Alternately, the circular plates may have mutually registrable holes therein which are arranged in a circular configuration concentric to the plate and which are suitable for accommodating a pin to lock the plates together. Each interface is divided, by its splines or holes, into a different number of equal segments defining the various possible relative positions of each interface.

The plates are mounted such that they may be selectively fixed relative to the rotatable shaft, or allowed to free-wheel upon it. Thus, the three circular plates, while free-wheeling, may be selectively disposed with respect to each other in any desired fashion permitted by the matching of their splines or holes. A very large number of relative angular displacements may be registered by the appropriate relative rotation of the plates.

It can, therefore, be seen that one can establish a particular angular displacement, or swing increment, the degree thereof being the sum of the relative angular displacements of each of the circular plates.

It has been discovered that, where a given swing increment is to be marked off, the increment can be approximated with extreme precision by adding together the displacements realized by rotating each of the circular plates through an appropriately chosen number of its segments. The said respective numbers of segments through which the respective plates are rotated is a unique combination of values determined by the number of segments of each interface, and the length of the arc to be subtended by the cumulative rotation of the three plates. It is important to note that these values are not chosen in a fashion in which one plate is rotated to most nearly approximate the total desired rotation, the others being used only to accomplish the finer vernier adjustment.

When the increment defined by the cumulative plate rotation is established, it is marked by appropriate means and the work piece is rotated in successive increments equal to the angular displacement of the swing increment. A dividing index is made on the work piece after each increment of rotation. It can therefore be seen that this apparatus is capable of dividing the circular work piece into a number of equal segments, the number of such segments being dependent upon the length of the increment through which the work piece is rotated in each increment.

By choosing the respective number of segments of each interface to be relatively prime, (but not limiting them to this constraint) it is possible to establish swing increments such that the work piece can be divided into any of a broad range of numbers of equal divisions. This is in contrast to prior art devices which can accomplish only selected numbers of segments within a range.

The apparatus of the present invention rotates the work piece by direct drive, eliminating the errors of gear reduction. It also renders unnecessary the use of gage blocks and the errors attendant on their use.

Applicant has found that when the circular plates are made up of 99, 200 and 101 segments, respectively, it is possible, by proper selection of the number of these segments through which each plate is rotated, to physically approximate a desired swing increment to within one arc second, including mathematical error. This degree of accuracy of approximation is believed to be remarkably superior to accuracy achievable with prior art mechanisms and methods. Other sets of figures resulting in various degrees of accuracy are easily constructed. For example, (99, 100, 202), (133, 143, 105) and many others, not necessarily limited to three members. Flexibility of the mathematical techniques is discussed hereinafter.

Where splined interfaces are used, it is generally desirable that the splines on each interface be as nearly adjacent as possible. This assures that the interfaces mesh well together. The number of splines on a circular interface which provides the nearest approximation to adjacency depends on the width of each spline and the dimension of the disc.

Accordingly, it is desirable, where warranted, to place on each interface the number of splines dictated by the mathematical requirements for the machine, multiplied by an appropriate integer. For example, in a case such as set forth above, where discs having 99, 100 and 202 splines are mathematically required, it may be advantageous to actually use discs having 198 (i.e. 2 × 99), 200 (i.e. 2 × 100), and 202 splines. In the case of 198 splines, where 99 are required by the math, only every other spline is numbered.

This invention also contemplates means for distributing the incremental error which does exist among all the indices of division which are made on the work piece. This relieves the problem of prior art machines in which the error of each rotational increment tends to accumulate or "pile up" as indices are progressively made around the work piece, terminating in a relatively large error between the first and last indices marked.

This problem is alleviated by selecting an increment for rotation which is a multiple (yet not a factor) of the intended predetermined distances between adjacent indices. In this way, adjacent indices are generally not marked on successive rotations. Instead, indices are marked about the entire work piece until all the marks are made.

This invention also contemplates use of a spanner disc which is mounted concentric to the shaft. The spanner disc has radially ending holes in its edge, suitable for accommodating spanner pins. A spanner stop piece is positioned on the machine to engage the pins. When the work piece is swung through an increment and an index made, it is possible to conveniently make another mark which is offset in either direction from the first by a fixed amount. This is done by further rotating the shaft and spanner disc until a spanner pin engages the spanner stop. In some special cases the spanner may be used independently of the segmented plate means, such as when the desired spacing between indices to be made is an integral multiple of the distance between the holes in the spanner disc.

DESCRIPTION OF THE DRAWINGS

FIG. 2 is a perspective view of the mechanism of this invention, showing the plates as having splined interfaces.

FIG. 3 is a full section side view of the apparatus of this invention.

FIG. 4 is a detail view showing the profile of the face splines of the circular plates of this apparatus.

FIG. 5 is an exploded view of the various plates and discs of the apparatus showing their alignment on the shaft.

FIG. 6 is a detailed sectional view showing the crank assembly of the apparatus.

FIG. 7 is a perspective view of the work brake and chuck assembly of the apparatus.

FIG. 8 is a detail view showing the stop pin assembly of the apparatus.

DESCRIPTION OF THE PREFERRED EMBODIMENT

Figure 1:
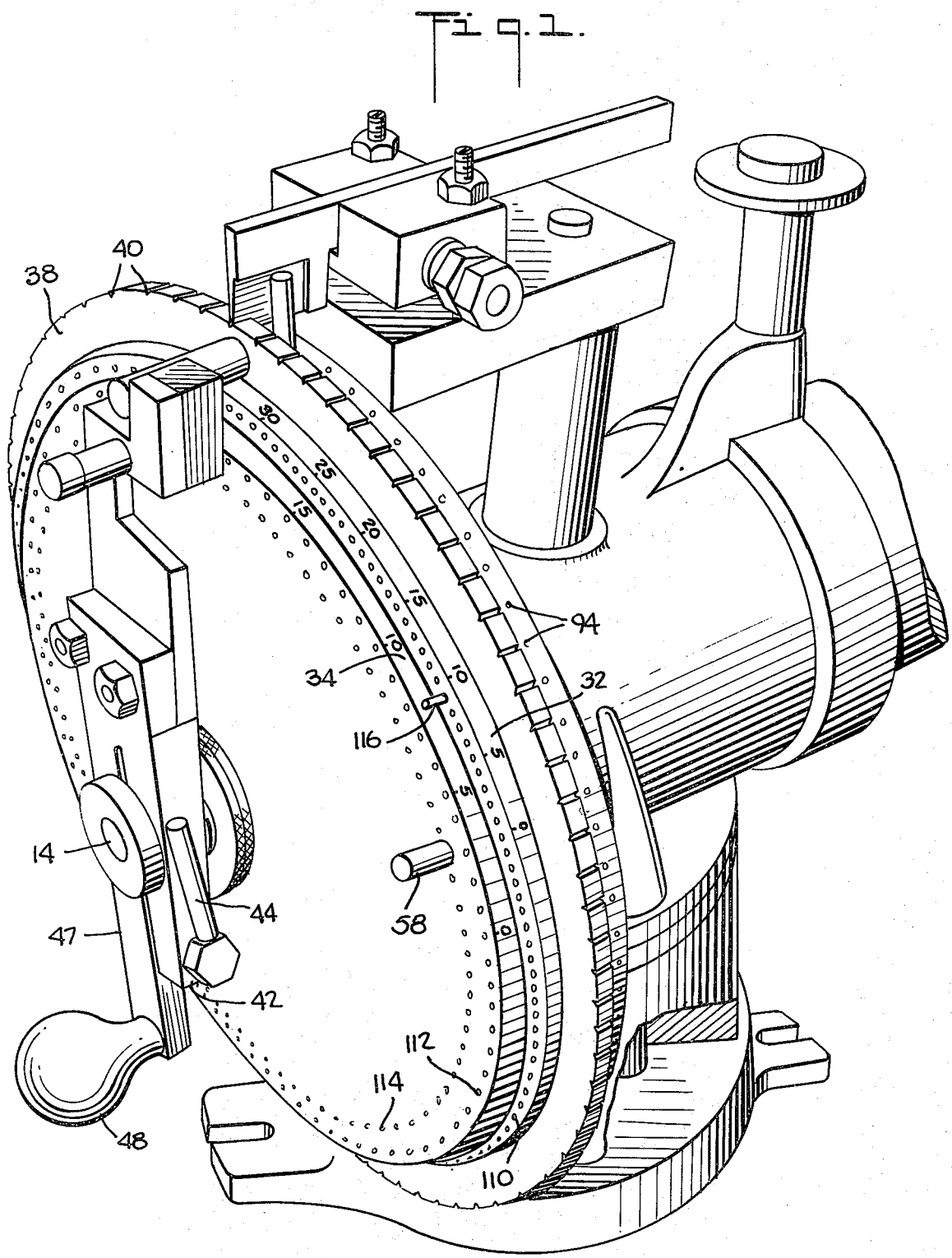
FIG. 1 is a perspective view of the apparatus of this invention, showing the circular plates in their assembled configuration, the plates having holes therein for locking them in their relative angular displacement.

As shown in FIGS. 1, 2, and 3, the apparatus of this invention includes a base member 10 supporting a horizontal cylindrical element 12.

Shaft 14 extends through cylindrical housing 12 and is rotatably mounted therein by means of prestressed bearings 15, each bearing including inner race 15a, outer race 15b and ball bearings 15c.

A sleeve 17 is mounted over one end of shaft 14. Sleeve 17 is attached to cylindrical housing 12 in such a way that it need not rotate with shaft 14, but provides a supportive housing surrounding the shaft for the purpose of supporting other elements described below which are concentric to shaft 14 and sleeve 17.

On sleeve 17 is rotatably mounted notched disc 38. Disc 38 possesses 100 equally spaced notches 40 about its periphery. Fixed to the cylindrical housing of the machine is an adjustable blade stop assembly 62, having blade element 64 which is adjustable, by movement of lever 65, to selectively engage by spring pressure the one of notches 40 of disc 38 which is positioned at the top dead center location. By use of the blade stop assembly, the notched disc may be firmly locked in position by the engagement of knife blade 64 in the top dead center notch. Stop pin 52, whose function is described below, is fastened to notched disc 38 by means of block assembly 122 which is bolted to disc 38.

Also mounted on sleeve 17 are circular splined plates 30, 32 and 34. The splined plates are freely rotatable with respect to sleeve 17. The splined plates and notched disc 38 each are radially splined on their facing surfaces. Thus, notched disc 38 and each of the circular splined plates form a total of three interfaces, designated as 31, 33 and 35. The facing surfaces of each interface bear an equal number of matching splines. Each interface, however, has a different number of matching splines. When adjacent discs or plates are pressed together, the splines securely lock the adjacent plates together, preventing rotational motion between them. One side of each interface is positionable relative to its other side at a number of equally spaced intervals equal to the number of splines on that interface.

Applicant has found that a preferred combination of numbers for the respective three interfaces is 99, 101, and 200. The 99-spline interface actually carries 198 splines, their number being doubled in order to provide a number of splines which mesh smoothly, while still allowing the conformity of the machine to the mathematical requirement of 99 segments. This technique for varying the number of splines is set forth above. The manner of selecting the numbers of facing splines at each interface is described fully below. Each interface is visibly indexed around the outside of one of its component plates, to enable the operator to see the relative position of the interface components.

Also mounted on sleeve 17 outside the circular splined plates is pressure plate 70. The outermost extremity of sleeve 17, for about 1½ inches, is threaded. The threaded portion is suited to accommodate the threaded engagement of knurled nut 72. When nut 72 is tightened upon sleeve 17, the circular plates and notched disc are pressed together, the opposing force furnished by the opposition of step 17a on sleeve 17 to sliding movement of disc 38. Disc 38 and the circular plates can thus be locked together.

It can be seen, therefore, that it is possible with this assembly to position the splined plates and notched disc in any relative rotational configuration permitted by the splines, and to subsequently lock the disc and plates in that configuration. This is done by rotating the notched disc to its desired position, and engaging the appropriate notch with the blade 64. This prevents rotation of the notched disc. All that remains to be done to secure the entire assembly in a fixed rotational position is to tighten knurled nut 72, exerting pressure on the entire assembly by means of pressure plate 70.

Mounted on the end of shaft 14 is reciprocating lever 47, having handle 48. Reciprocating lever 47 can selectively be rotationally fixed to shaft 14 by means of clamp 42 which is loosened or tightened by means of lever 44 engaged to the threaded portion of the clamp. As shown in FIG. 6, lever 47 rides on shaft 14 by means of triple segmented O-ring 47a. The segments of O-ring 47a tighten on the shaft when clamp 42 is tightened, enabling a creep-free selective securing of the crank to the shaft.

A ferromagnetic stop pin 52 is secured to notched disc 38 by a specialized adjustment assembly. The adjustment assembly includes protrusions 120 on notched disc 38. Pin 52 is secured to bar member 122 and bar member 122 is fastened to disc 38 by means of pivot 124. Screws 128 threadedly engaged with nut members 126, extend through threaded holes in bar 122, such that by rotation of screws 128 they may adjustably engage protrusions 120. It can be seen that, by appropriately adjusting the rotation of screws 128, bar 122 and pin 52 may be caused to rotate about pivot 124 over a desired range, and locked by tightening nut members 126.

The function of this adjustment assembly is to provide for an accurate fine adjustment of the position of pin 52 relative to disc 38 during original calibration. This adjustment is useful in order that pin 52 may be precisely aligned in the twelve o'clock position when a particular notch 40 of disc 38 is engaged with the blade member.

Stop pin 52 is positioned such that it will engage, as a stop member, magnetic foot 56 of lever 47, when the lever is rotated sufficiently in a counter-clockwise direction. Foot 56 is a permanently magnetic member and serves to insure a tight and reproducible engagement against pin 52 when lever 47 is rotated to engage that pin.

A second pin, limit pin 58, is provided, limit pin 58 being adapted to be secured in a hole at the zero mark on plate 34. This zero point is marked as part of the visible indexing of plates noted above. Thus, when plate 34 has been rotated through a predetermined arc and the plates have been fixed relative to the base of the machine by means of pressure from pressure ring 70, and limit pin 58 has been mounted in the hole at the zero point of plate 34, reciprocating lever 47 is free to rotate only through the arc defined by pins 52 and 58. When clamp 47 is tightened upon shaft 14, the rotation of shaft 14 is likewise limited. Reciprocating lever 47 also bears a second permanently magnetic foot 56a which assures a tight engagement of limit pin 58 and the lever 47, as explained with respect to foot 56.

Referring to FIG. 7, it is further noted that the end of shaft 14 opposite that bearing lever 47 carries a disc 22 and a separate chuck 16, both of which are selectively rotationally fixed to the shaft. Chuck 16 is adapted to removably grasp work piece 18. A cutting tool (not shown) is provided at a station which is fixed with respect to this apparatus in order to selectively mark or cut indices in work piece 18, the position of such indices being dependent on the rotational position of the work piece when the cutting tool is operated.

Fixed to the divider head apparatus is a steel block 20 having a recess 21 adapted to receive the outer edge of disc 22. Bronze caliper pad 24 is attached by bushing 28 to threaded shaft 29 protruding through block 20 such that when shaft 29 is rotated in the appropriate direction caliper pad 24 engages disc 22 between itself and the inside surface of block 20, preventing rotation of shaft 14 and also necessarily of work piece 18. Knob 26 is attached to the end of shaft 29 to facilitate its rotation by hand.

This apparatus is operable to inscribe or cut indices on the work piece at predetermined intervals, as follows:

The work piece having been mounted in chuck 16, the operator separates plates 30, 32, 38 and 34 by means of unscrewing knurled nut 72 such that the plates can free-wheel on sleeve 17. Lever 44 is turned loosening the clamp so that crank 47 may rotate freely on the shaft.

The next step is to establish the swing increment of shaft 14 and work piece 18 which defines the incremental successive rotations of the work piece which dictate the number and spacing of indices which are to be cut on the work piece. This increment, as described above, is defined by the angle through which crank 47 may rotate as established by the placement of pins 52 and 58 The increment can be achieved by operation of the machine in several ways, depending on circumstances faced by the operator. The simplest operation is discussed first.

The placement of pin 52 is set by locking disc 38 in place by means of the engagement of blade 64 in one of its notches, usually zero.

The placement of pin 58 is then established by the position of plate 34. This positioning is done by successively rotating each plate the appropriate number of segments. These numbers are determined in accordance with the teachings set forth more fully below.

After positioning plates 38, 30, 32 and 34 in their appropriate positions, the operator then tightens knurled nut 72, pressing the plates together and against disc 38, which, because it is fixed relative to the base of the machine, holds all the plates stationary. Crank 47 is then rotated in a counterclockwise direction until foot 56 engages pin 52. Lever 44 is then moved so as to clamp crank 47 onto shaft 14. The work brake is then set, preventing movement of the workpiece. Note that the work brake and lever clamp have been engineered to produce a firm locking action when applied, and at the same time introduce negligible "creep" of the work during the many cycles of operation.

The cutting tool is then operated to inscribe or cut workpiece 18 in the location dictated by its position. After the initial index is made on workpiece 18, the work brake is released. Lever 47 is then rotated in a clockwise direction until foot 56a engages pin 58, thus stopping the rotation of the workpiece. The workbrake is again set, holding the workpiece firmly, while the second index cut is made. The clamp 42 is again released and lever 47 rotated clockwise until it again engages pin 52. The work piece may then be rotated similarly through another increment, defined by the arc between pins 52 and 58.

Repeated operation in this fashion enables the marking or cutting of a multiplicity of index marks, teeth or cuts in the workpiece, until the desired number of such cuts are made.

This apparatus is preferably provided with means to advance the workpiece in a two-stop fashion. One step is accomplished in the manner described above, using the reciprocating lever and the splined plates. The other step increment is achieved by means of notched disc 38 and spanner disc 90.

Spanner disc 90 is mounted on stepped portion 17a of sleeve 17. Spanner disc 90 possesses a friction fit on the step by means of O-ring 92. Spanner holes 94 are radially disposed around the edge of disc 90, at regular intervals. Holes 94 are suitable for engaging spanner pins 96 therein. Spanner stop 98 is fixed to cylindrical housing 12 so as to engage pins 96 when spanner disc 90 is rotated.

This two step process of incrementally rotating the workpiece is accomplished as follows:

First, lever 65 is moved to disengage blade 64 from the notches 40 of disc 38. The entire assembly including disc 38, and plates 30, 32 and 34 can then be rotated by hand as a unit, provided that pressure plate 70 is tightened to lock the plates together. If the three plates have previously been set up as explained above, and the reciprocating lever has been engaged against stop pin 52, with limit pin 58 in place, rotation of lever 47 in a clockwise direction will rotate the workpiece through the swing increment between pins 52 and 58. Additionally, when lever 47 (magnetic foot 56a) engages pin 58, continued force on lever 47 will then rotate plates 30, 32, and 34, disc 38 and spanner 90 a further clockwise rotational increment defined by the placement of spanner pins 96 in the spanner disc, and their engagement with spanner stop 98.

This means that the total rotational movement is the sum of the original swing increment defined by pins 52 and 58 plus the additional increment defined by the spanner pins. Thus, the splines plates, reciprocating lever and spanner can act in concert to define a rotational increment as a two step process. A mathematical example of such an application is presented below.

It is notable that, if blade 64 is engaged in notched disc 40 during movement of lever 47 from pins 52 to 58, a firm stop is provided for the work between the two steps of motion. If the work brake is set at this point, the workpiece can be indexed before the other step of rotation is executed. This having been done, blade 64 and the work brake can be disengaged and the workpiece rotated through the subsequent step, the degree of which is defined by the spanner disc and pins.

It is obvious that this technique can be used to index the workpiece at a first point and subsequently at a second point which is offset from the first by a predetermined interval. This is useful for tasks such as cutting a keyway on the workpiece.

It is further true that the spanner can be used to achieve two step rotational motion in a counterclockwise direction as well. The methods for doing so are analagous to these with respect to clockwise motion.

It is obvious that the spanner disc is operable to define a rotation increment either in concert with the splined plates and pins 52 and 58, or independently thereof. The spanner can be set up without setup of the splined plates, and the increment of motion can be that increment defined by the relation of the spanner pins and stop 98.

The discussion thus far has been limited to a detailed description of the preferred apparatus for carrying out the present invention. A general discussion of the fundamental mathematical concepts is useful at this time. It has been set out generally hereinabove that any angular swing increment can be represented by the sum of three or four separate angular displacements, four displacements being possible considering the spanner. These angular displacements can be achieved by the relative angular movement of each of three separate interfaces, and/or the use of a spanner. The total angular displacement thus achieved can approximate the desired total displacement with a certain degree of accuracy dependent on factors discussed below. The present embodiment provides for three plates and a spanner, but the techniques set forth herein are generally applicable to any number of plates with minimal adjustments.

In accordance with the present invention, and for simplicity, three angular displacements comprising the swing increment are measured by moving the circular plates relative to the disc 38, and to each other, and can be added to or subtracted from by the spanner as mentioned before. The three interfaces, and thus the plates, can each be moved relative to each other in increments equal to a full circle rotation, divided by the number of splines of the interface. For example, the two components of an interface having 90 numbered splines can be relatively rotated in increments of 1/99th of a circle.

Thus, if the interfaces have, respectively, 99, 200 and 101 splines, the sum of relative rotation between them will be:

$$\frac{N_1}{99} + \frac{N_2}{200} + \frac{N_3}{101}$$

of a circle, $N_1$, $N_2$ and $N_3$ being appropriately chosen variables. This expression, then, defines the total swing increment achievable considering the three plates, or the final positioning of pin 58, which is located at the zero point of disc 34.

The following discussion relates to the methods for designing the apparatus described generally above, such that it can be used to accomplish the objects described above.

Figure 9:
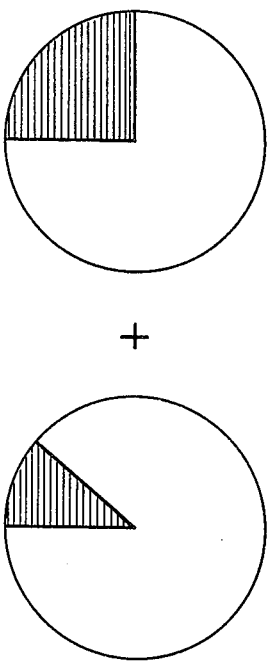
FIG. 9 is a graphical representation of the summation of three angular displacements to establish a swing increment.

Consider generally the task of representing a given total fraction of a circle by summation of predetermined numbers of segments of each of three other circles, the three other circles each being divided into a different total number of segments. This is represented in FIG. 9. Let the total desired angular displacement be represented by the fraction $$\frac{M}{N} = \frac{N_1}{D_1} + \frac{N_2}{D_2} + \frac{N_3}{D_3},$$

where $D_1$, $D_2$ and $D_3$ are the respective number of segments into which each of the three circles is divided, and $N_1$, $N_2$ and $N_3$ are the respective number of segments of each of the three circles which are taken to represent the total angular displacement (M/N).

The first task of the machine designer is to select appropriate values for $D_1$, $D_2$ and $D_3$, these numbers representing the number of segments into which each of the three circles is divided, which, in the present case are equivalent to the number of splines or holes between each interface. Note that the three circles indicated in this equation correspond to relative motion between each of the three interfaces 31, 33 and 35. The fraction (M/N) corresponds to the total angular displacement between the limit pin 58 which is mounted at the zero index on the outermost splined plate 34, and the stop pin 52, or in some applications, this distance plus the spanner increment.

It is known that the maximum error in approximating (M/N) by the three terms on the opposite side of the above equation is roughly one-half the inverse of the product of the non-common factors of the numbers $D_1$, $D_2$ and $D_3$. This can be shown algebraically in a known fashion. It is apparent that, to minimize the error of approximation and maximize the accuracy achievable by the representation of (M/N) by the three fractions of other circles, the numbers $D_1$, $D_2$ and $D_3$ should be relative primes, i.e., numbers which have no common factor. It is also apparent that the numbers $D_1$, $D_2$ and $D_3$ should be as large as possible. In terms of machine requirements, this means that the interfaces 31, 33 and 35 of the splined plates be provided with splines which are as closely spaced as possible.

With the above guidelines and requirements in mind, applicants have discovered that great accuracy can be achieved with a machine whose splined interfaces are divided into 99, 100 and 202 segments, respectively. It is noted, however, that this invention does not require the selection of these particular numbers of splines. Some persons who may apply the invention may find that their accuracy requirements are not so great as to require the splined interfaces to be divided into so many segments; others with higher accuracy requirements, may find it desirable to divide the splined interfaces into even more segments than have applicants.

It is additionally noteworthy that one operating within the spirit of this invention could employ fewer or greater splined interfaces than have applicants. Greater math accuracy is obtainable if four splined interfaces are used having a greater number of splines. Some applications, however, may necessitate use of only two such interfaces. It is also contemplated that the manner of registering the respective angular displacements of the three component circles need not be limited to locking the splined plates in predetermined rotational positions with respect to each other by means of splined interfaces. Other means embodying these general concepts could be devised by those of skill in the art.

Applicants have so devised an alternate structure for accomplishing this goal. Instead of providing the plates with splined interfaces, each plates 30, 32 and 34 is provided with a circular array of holes 110, 112 and 114 concentric to its center of rotation. Each of these holes is suitable for accommodating a registration pin 116 inserted therein. The number of holes in each of arrays 110, 112 and 114 corresponds to the values for $D_1$, $D_2$ and $D_3$, the denominators of the fractions. Relative rotational movement between the various pairs of adjacent plates can be indexed visually by the placement of pins in the appropriate holes of the various discs.

More specifically, as shown in FIG. 1, applicants have provided an operable configuration according to this alternate embodiment which permits the disposition of three arrays of holes in only two plates, plates 32 and 34, and has a spanner element as before. Plate 32 is provided with array 110 with equally spaced holes, whose number is equal to the value of $D_1$. The holes of array 110 are numbered consecutively in a counterclockwise direction. Plate 34 is provided with two such arrays of holes, 112 and 114, the number of holes in each array corresponding to the value for $D_2$ and $D_3$, respectively. The holes of array 112 are numbered consecutively in a counterclockwise direction, and the holes of array 114 are numbered consecutively in a clockwise direction. The holes designated zero in each of arrays 112 and 114 are aligned. The operation of the alternate embodiment is in accordance with the following procedure:

The knurled nut is unscrewed to release the pressure plate, rendering plates 32 and 34 relatively movable. The operator then rotates plate 32 in a clockwise direction until the hole of its array 110, whose number is equal to the value of $N_1$, is in the twelve o'clock position. He then places a registration pin in the $N_1$ hole. This temporarily prevents further rotation of plate 32. He then rotates plate 34 to align that hole of array 112, whose number corresponds to the value $N_2$, with the hole numbered zero in array 110 and inserts another registration pin. He then tightens the knurled nut and pressure plate, thus locking plates 32 and 34 preventing further movement, and removes both registration pins.

Now turning to array 114, the number of holes of which corresponds to the value of $D_3$, the operator places limitation pin 58 in that hole of array 114, whose number corresponds to the value $N_3$.

The swing increment thus established between stop pin 52, at the 12 o'clock position, and limitation pin 58 is $$\frac{N_1}{D_1} + \frac{N_2}{D_2} + \frac{N_3}{D_3}.$$

As before, this embodiment is operable with the spanner and lever independently or in conjunction and in either counterclockwise or clockwise direction for special applications.

Having discussed the general mathematical principles, and two structures accomplishing the objects of these principles, the specific mathematical techniques actually employed are set forth next.

It is noted that one of the primary applications of the apparatus and method of this invention is related to marking or indexing a circular work piece for the purpose of cutting teeth into the periphery thereof, such as in the instance of a gear. In the case of such an object, it is appropriate that the fraction (M/N) represent the ratio between the number of gear teeth over which each sequential swing increment of the workpiece extends, to the total number of gear teeth to be cut in the workpiece.

Correct selection of the value for M is essential. In most of the prior art dividing or gear cutting operations, the machine used is set up to swing through an increment equal to the spacing between adjacent gear teeth. Thus, each tooth is cut, successively around the entire work piece, until all the teeth are cut. It is apparant that in any machine, the increment of swing will always differ from the ideally desired increment by some amount, notwithstanding that the error may be quite small. If the teeth are cut successively around the workpiece, each tooth will be displaced from its desired position by an amount equal to the number of teeth previously cut times the error attendant on swinging through each increment. Therefore, each tooth will be displaced by a succeedingly greater angular displacement, and each tooth, save the last one cut, will be slightly wider or narrower than desired, in an amount equal to the error in swinging through one increment. Additionally, and more significantly, there will appear at the last tooth cut, an error in the width of that tooth which is equal to the cumulative error which has "piled up" with the cutting of all the preceeding teeth. Thus, this cumulative error in the last tooth will be equal to the product of the error for each swing increment times the number of teeth cut, minus one. That is to say, if the error in moving through any swing increment of one tooth is represented by E, each tooth except the last one will be thick or thin by the amount E, and the error in the width of the last tooth will be $\pm E$ (N-1). The method of this invention, on the other hand, contemplates establishing the increment of swing as a value equal to some integral multiple of the spacing between the teeth or indices. Thus, in each swing, a number of teeth are skipped. The form of "skip cutting" enables one to distribute the accumulated error around the work piece, rather than having the error accumulate in an exceptionally large deviation at one tooth, while leaving other teeth relatively much more accurate. This minimizes the "pile up" of error which has been discussed above. Thus, where the total number of teeth to be cut is N, the number of teeth skipped with every swing increment may be represented by M. It is important to choose M such that the maximum deviation in width of any particular tooth is kept at a minimum, as will be discussed hereinbelow.

The error E which appears in each increment of swing is a result to two factors. Firstly, the error results from the inability, in most cases, to mathematically represent exactly the swing increment which is desired by means of the fractions of the three circles described above. The other source of error can be designated as "machine error". This is the error attendant on imprecision in manufacturing a machine which is dimensioned perfectly in accordance with the designers' wishes.

The following notation shall be used herein to represent the various type of error.

Z = mathematical error
m = machine error
E = Z + m, or total error.

Note that the mathematical error, in accordance with the above discussion, can be made as small as one wishes, notwithstanding that it is impossible in most cases to eliminate it completely. The error can be made small, as pointed out above, by increasing the number of splines on each of the splined interfaces, and/or by using more than three splined interfaces.

Calculations can presently be performed to determine values of $D_1$, $D_2$ and $D_3$ resulting in mathematical accuracy far beyond that of any machine that can presently be constructed. Accordingly, calculations have been prepared having accuracy superior to the constraints of constructability, while simultaneously minimizing the impact of the machine error. Ignoring the problems of machine error and "pile up" for the moment, we inspect the calculations to determine M, given N = 19, that results in a minimum Z.

The mathematical error in swing increment is minimized by choosing a value for M which allows optimal approximation of swing increment (M/N) by the terms $$\frac{N_1}{D_1} + \frac{N_2}{D_2} + \frac{N_3}{D_3}.$$

Note that the equation above transforms to:

$$N_1 D_2 D_3 + N_2 D_1 D_3 + N_3 D_1 D_2 = (M/N) D_1 D_2 D_3.$$

Representing the left side by L, we get:

$$L = D_1 D_2 D_3 (M/N).$$

There exist values of $N_1$, $N_2$, and $N_3$ such that L can take on the value of any integer. The approximation of the right side by L is optimal when the remainder arrived at by the division of (M/N) on the right side of the equation is minimal, this being done by the appropriate choice of M. The values of $D_1$, $D_2$, $D_3$ and N are known in any given problem. An example is helpful:

If $D_1$, $D_2$ and $D_3$ equal 99, 200 and 101, respectively, and N, the number of teeth to be cut, is 19, we wish to determine M resulting in minimal math error (Z). The equation is now:

$$L = 1999800 \, (M/19).$$

To minimize the error in approximating L by 1999800 (M/19), M should be chosen to minimize the remainder when 1999800 is divided by 19 and multiplied by M. This is done as follows: Dividing 1999800 by N, the equation becomes:

$$L = (105252 + (12M/19).$$

thus, $L = 105252M + (12M/19).$

Since 105252M is an integer and we can represent any integer exactly by L, the only term causing error is (12M/19). This term can be expressed as (12M/19) = $Q^1 + (R^1/19)$, $Q^1$ being the quotient and $R^1$ the remainder. It is seen that, for all choices of M, the remainder is least (1) when M = 8. Substituting M = 8 into the equations for L, it becomes:

$$L = 105252 \, (8) + (12(8)/19)$$

$$L = 842016 + 5 + 1/19)$$

$$L = 842021 + 1/19).$$

The term 842021 is exactly represented by L. The approximation of the right side by L (the sum of the three angular displacements achieved by rotating the plates, 30, 32 and 34) is in fractional error by 1/842021(19) = .0000000625, and by .0000000263 absolutely, a very small error indeed.

The total error, g, in the placement of any cut, however, is equal to N(Z+m), where $n$ is the number of swing increments which have occurred since the initial cut, Z is the mathematical error per swing, and $m$ is the machine error per swing.

However, the error in the size of the interval between two cuts (which corresponds to the error in the size of teeth cut) for a given N is a function of M.

Figure 10:
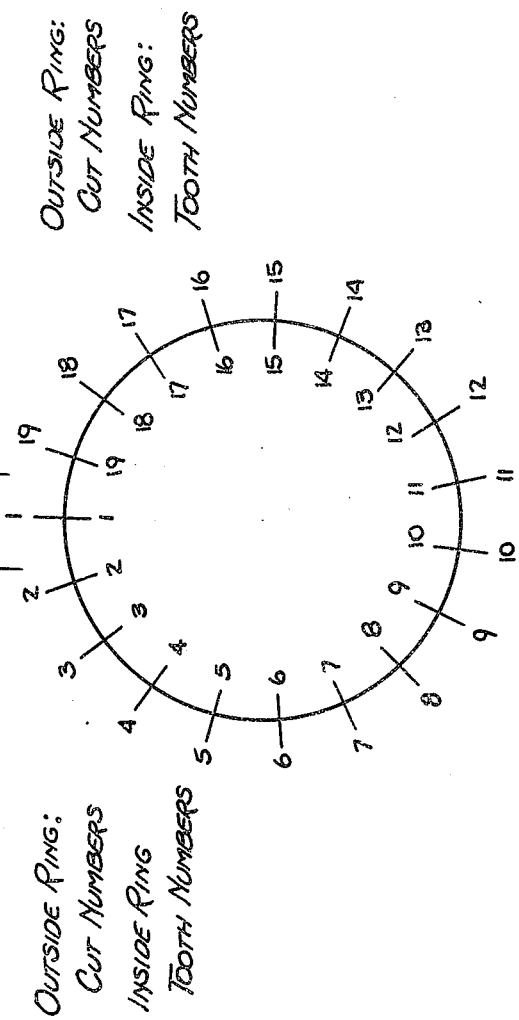
FIG. 10a is a graphical representation of the sequence of cutting of gear teeth when accomplished by the disclosed skip cut method.
FIG. 10b is a graphical representation of the sequence of cutting gear teeth when done in accordance with prior art methods.
Figure 10:
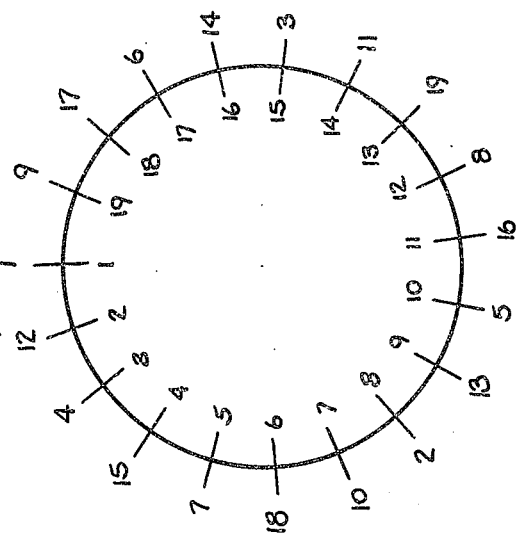

This is illustrated in FIG. 10a–10b. FIG. 10a shows a graphical representation of a circle divided into N=19 parts, by a skip cut method, M=7. The numbers inside the circle represent tooth members, running successively in a counterclockwise direction. The numbers on the outside represent the order in which the teeth are cut. The teeth are cut counterclockwise in 7-teeth intervals. The error between any pair of adjacent cuts equals (Z+m) [Cut number for cut $C_i$+1 — Cut number for cut $C_i$.] Setting the bracketed term as $d$, it can be noted that for any given pair of adjacent cuts, $d$ is dependent on M, holding N constant.

In FIG. 10a, M=7, and the error between teeth 1 and 2 = 11 (Z+m). This is also the maximum error between any two teeth. The minimum error between two adjacent teeth is 4−12(Z+m) = −8(Z=m). We note here that the error between any two cuts takes on one of two values, one positive and the other negative. In other word, various multiples of the term (Z=m) appear around the periphery. In all cases we call these two multiples $d'$ and $d$, having the characteristics: $|d'| > |d|$ and $|d'| + |d| = N$. In FIG. 10b M = 1, which is common in the prior art. There, the error between teeth 1 and 2 is 1 (Z+m). The error between teeth 1 and 19, however, is-18 (Z+m). Thus the error between any two teeth, and the maximum error, depends on selection of M.

Ordinarily, it is more significant in, for example, gear cutting, that the maximum error be minimized than for the average error between teeth to be as low as possible. Therefore, M should be chosen to achieve the former goal.

Error can be reduced, then, by choice of M, in one of two ways: Mathematical error can be minimized by choosing M such that the remainder in the main equation is smallest. The method for doing this has already been explained. Minimum error in tooth size can be accomplished by another choice of M. These two values for M are usually unequal. Hence a dilemma: reduce mathematical error Z, neglecting the impact this has on "pile up", or select M to minimize the maximum multiple of (Z+m) between successive teeth, and let Z fall as it may.

The mathematical error Z can be reduced, no matter what M is chosen, in ways other than choice of M. The number of segments of the plates can be increased, or more plates can be used. The machine error $m$, however, cannot be arbitrarily reduced. Therefore, unless machine error can be markedly reduced by better manufacturing, error can be reduced most effectively by use of a value for M which minimizes the maximum multiple of (Z+m) occurring. In other words, because the largest math error is still smaller than the machine error, ultimate optimization is obtained by minimizing $d'$ through appropriate choice of M, and accepting the Z value which results from this technique. This conclusion is based on the comparison of the math optimization contained hereinabove, in conjunction with experiments determining the accuracy with which the machine can be constructed, and with the restraint that the increment be of reasonable length.

To this end, applicants have determined empirically, rules for selecting M as a function of N, the total number of teeth to be cut. As far as is presently known, no feasible way exists for theoretically deriving, for this purpose, the general relationships between all values of M and N resulting in a minimization of $d'$.

In accordance with the determinations made by applicants, the following relationships specify the appropriate value for M for any value of N, other than odd multiples of 3, odd multiples of 3 being a special case.

It is noted that all even numbers can be generated by the expressions $8x$, $8x+4$, $8x+6$, where $x$ takes on values of 0,1,2,3, . . . . Where N is an even number, the corresponding optimal value of M may be represented by the following table:

TABLE I

| N | M |
|---|---|
| $8x$ | $4x-1$ |

TABLE I-Continued

| N | M |
|---|---|
| 8x+2 | 2x+1 |
| 8x+4 | 4x+1 |
| 8x+6 | 2x+1 |

This table of values for M, the number of teeth "skipped" in each swing increment, has empirically been determined to set forth those values of M for all even values of N which minimize the maximum error in tooth width or in spacing between indices marked. More significant, however, is the fact that the value of M chosen in accordance with this table eliminates the relatively large error in tooth width occurring at the last tooth cut when the teeth are cut in succession.

In the case of odd values for N, the optimum values for M are defined by the following table:

TABLE II

| N | M |
|---|---|
| 6x+1 | 2x+1 |
| 6x+3 | Special case |
| 6x+5 | 2x+1 |

It is noted that no specific relationship has been set forth for values of M which correspond to the values of N expressed as 6x+3 (Odd multiples of three). Applicants have not determined a simple relationship for defining the optimum M under these circumstances and do not expect that one exists. Optimum values of M for values of N having selected values of odd multiples of 3 are, however, set forth in the following table:

TABLE III

| Value of N | Optimum Value of M | d',d |
|---|---|---|
| 3 | 1 | -2, 1 |
| 9 | 4 | 7, -2 |
| 15 | 4 | -11, 4 |
| 21 | 8 | -13, 8 |
| 27 | 5 | -16, 11 |
| 33 | 7 | 19, -14 |
| 39 | 16 | 22, -17 |
| 45 | 19 | -26, 19 |
| 51 | 20 | -28, 23 |
| 57 | 11 | -31, 26 |
| 63 | 13 | 34, -29 |
| 69 | 28 | 37, -32 |
| 75 | 11 | 41, -34 |
| 81 | 32 | -43, 38 |
| 87 | 17 | -46, 41 |
| 93 | 19 | 49, -44 |
| 99 | 40 | 52, -47 |

Having chosen the values for $D_1$, $D_2$, and $D_3$ and for M, N being a given value, it remains, for a complete setup of the machine, to choose appropriate values of $N_1$, $N_2$, and $N_3$. These latter values refer to the number of segments of each of the circles constituted by the splined interfaces of the circular splined plates.

PROCEDURE I

This is accomplished by a method having several steps. consider once more the basic equation above for representing the fraction M/N. That is, $$\frac{N_1}{D_1} + \frac{N_2}{D_2} + \frac{N_3}{D_3} = \frac{M}{N}.$$

This equation algebraically transforms to: $N_1D_2D_3 + N_2D_1D_3 + N_3D_1D_2 = M/N (D_1D_2D_3)$. If the notation, $K_1$, $K_2$ and $K_3$ are substituted respectively for $D_2D_3$, $D_1D_3$, and $D_1D_2$, the equation becomes: $K_1N_1 + K_2N_2 + K_3N_3 = M/N(D_1D_2D_3)$. All of the values in this equation, with the exception of $N_1$, $N_2$ $N_3$, are known. Thus, the expression $M/N (D_1D_2D_3)$ can be converted to the form $Q + R/N$, Q being the whole number quotient determined by dividing $MD_1D_2D_3$ by N, and R being the remainder when that operation is performed. For purposes of determining $N_1$, $N_2$ and $N_3$, the remainder R is disregarded if it exists, and only the quotient Q is considered. (Recall here that $(R)/(Q) (M)/(N)$ = absolute error.)

In the search for appropriate values of $N_1$, $N_2$ and $N_3$ to balance this equation (disregarding R) a starting point is achieved by dividing Q by the sum of $K_1$, $K_2$ and $K_3$. This yields a whole number quotient and usually an additional remainder. $N_1$, $N_2$ and $N_3$ are each set tentatively equal to that integer quotient as a first approximation. The machine designer then must alter these tentative values for $N_1$, $N_2$ and $N_3$ to balance this equation precisely. It is helpful in seeking the appropriate values for $N_1$, $N_2$ and $N_3$, to devise various combinations of these numbers (perhaps including negative numbers) which, when substituted into the expression $K_1N_1 + K_2N_2 + K_3N_3$, yield a total value which is relatively small. Each of these latter trial values of $N_1$, $N_2$ and $N_3$ can be multiplied by a constant which yields a total for $K_1N_1 + K_2N_2 + K_3N_3$ which, when added to the value of the equation obtained with the original, tentative values, more closely approximates the desired result to balance the equation. This process can be repeated until the appropriate value is found.

More particularly, the first step comprises substituting $$\frac{Q}{K_1+K_2+K_3} \text{(integer division)}$$

for each of $N_1$, $N_2$ and $N_3$. The value X for $K_1N_1 + K_2N_2 + K_3N_3$ is then computed, and the value for $Q - X$ is noted. The smallest of $K_1$, $K_2$ and $K_3$ (called Ks herein) is integer divided into $Q - X$, the integer obtained is added to Ks, and the value for $K_1N_1 + K_2N_2 + K_3N_3$ is recomputed. This value is called $X_1$.

The expression $K_1N_1 + K_2N_2 + K_3N_3$ is then inspected to determine sets of values for $N_1$, $N_2$ and $N_3$ (expressed herein as $(N_1, N_2, N_3)$) which, when substituted into the expression, yield a value smaller than $Q - X_1$. When such a set of values $(N_a, N_b, N_c)$ is found, the value of the expression for this set of values of N is computed and the result ($X_2$ herein) is integer divided into $X_1 - Q$. The set of values $(N_a, N_b, N_c)$ is multiplied by $$\frac{X_1 - Q}{X_2} \text{(integer division)},$$

and the resulting set of values for N is added to the set $(N_1, N_2, N_3)$ used in determining $X_1$. Let this addition be designated as $$(N_1, N_2, N_3) + (N_a, N_b, N_c) \frac{X_1 - Q}{X_2},$$

and let the result of the addition be designated ($N_d$, $N_e$, $N_f$). Substituting ($N_d$, $N_e$, $N_f$) into the expression yields a new value, $X_3$, which even more closely approximates Q.

The expression is again inspected to determine a set of values ($N_g$, $N_h$, $N_i$) which cause the value of the expression to equal unity. These values are multiplied by $X_3 - Q$, to obtain a set of values which, when added to ($N_d$, $N_e$, $N_f$) provides a set of values of $N_1$, $N_2$ and $N_3$ which cause the expression $K_1N_1 + K_2N_2 + K_3N_3$ to equal Q.

Wherever the final values for $N_1$, $N_2$ and $N_3$ thus obtained are greater than $D_1$, $D_2$ or $D_3$, respectively, the proper value for $N_1$, $N_2$ or $N_3$ is finally determined as the remainder of the division of each numerator $N_1$, $N_2$ and $N_3$ by its respective denominator. Thus, the values for $N_1$, $N_2$ and $N_3$ in the equation are determined which balance the equation:

$$\frac{N_1}{D_1} + \frac{N_2}{D_2} + \frac{N_3}{D_3} = \frac{M}{N}.$$

An example employing specific values is helpful.

In the above equation, let us consider the following values:

$N = 19$
$D_1 = 99$
$D_2 = 200$
$D_3 = 101$

The problem is to determine M, $N_1$, $N_2$, $N_3$. M is determined from Table II. $N = 19$, an odd number is expressible as $6x+1$ where $x = 3$. The corresponding value for M is $2x+1$, or 7.

The main equation thus becomes:

$$\frac{N_1}{99} + \frac{N_2}{200} + \frac{N_3}{101} = \frac{7}{19}.$$

This becomes:

$20200 N_1 + 9999 N_2 + 19800 N_3 = 736768 + R$

Dropping R, this becomes:

$$K_1N_1 + K_2N_2 + K_3N_3 = 736768 = Q$$

$K_1 + K_2 + K_3 = 49999$.

To find the first tentative values for $N_1$, $N_2$, $N_3$, integer divide:

$$\frac{736{,}768}{49999} = 14^+.$$

($N_1$, $N_2$, $N_3$) = (14, 14, 14). Substituting, we obtain:

$$20200(14) + 9999(14) + 19800(14) = 699986 = X$$

$Q - X = 766768 - 699986$
$= 36782$

Taking the smallest of $K_1$, $K_2$ and $K_3$, which is 9999, $$\frac{Q - X}{K_s} = \frac{36782}{9999} = 3^+$$

Adjusting $K_s$ (in this case $K_2$) by +3, ($N_1$, $N_2$, $N_3$) = (14, 17, 14).

$$20200(14) + 9999(17) + 19800(14) = 729983 = X_1.$$

$Q - X_1 = 6785.$

It can be seen by inspection that if ($N_1$, $N_2$, $N_3$) is altered by (1, -4, 1), the change in value of $K_1N_1 + K_2N_2 + K_3N_3 = +4$. ($N_a$, $N_b$, $N_c$) = (1, -4, 1) $Q - X_1 = 6785$.

$$\frac{Q - X_1}{4} = 1696^+$$

$1696 (1, -4, 1) = (1696, -6784, 1969)$ $(1696, -6784, 1696) + (14, 17, 14)$
$= (1710, -6767, 1710)$
$= (N_d, N_e, N_f).$
$Q - X_2 = 736768 - 736767$
$= 1$
$= X_3$

By inspection, $K_1N_1 + K_2N_2 + K_3N_3 = 1$ when $N_1 = 25$, $= -1$, $N_3 = -25$. i.e. ($N_g$, $N_h$, $N_i$) = (25, -1, -25). $(1710, -6767, 1710) + (25, -1, -25) = (1735, -6768, 1685)$ $20200 (1735) + (9999)(-6768) + (19800)(1685) = 736768 = Q$ Therefore, $\frac{1735}{99} + \frac{-6768}{200} + \frac{1685}{101} \quad \frac{7}{19}$ Dividing numerators by denominators and substituting the remainders for $N_1$, $N_2$ and $N_3$, we get:

$$\frac{52}{99} + \frac{32}{200} + \frac{69}{101} \quad \frac{7}{19}$$

or: $.368420842083 \approx .368421052631$

Therefore mathematical error Z $= .000000210548.$

In the last step, Z is determined by subtraction. Z could also be determined from the relation:

$$\frac{1999800 \times 7}{19} = 736768 + \frac{8}{19}$$

$$R = \frac{8}{19}$$

$$Z = \frac{\frac{8}{19}}{736768}$$

$= .0000002105$ of a circle.
$=$ 1 arc second $= .0000007716$. $Z \cong .3$ arc seconds.

A common requirement is to cut gear teeth or index marks on a circular work piece at intervals of 1 degree or multiples thereof. The apparatus and method of this invention is readily susceptible to being set up to accomplish this task. For this purpose, analysis similar to that described above in determining the values of $N_1$, $N_2$ and $N_3$ is used.

In this application, N is set to be 360, while M is 1.

Following analysis which is analogous to that set forth above, the settings for 1 degree swing increments is 77 on the 99 segment interface and 45 on the 200 segment interface, the setting on the 101 interface being 0. Settings for other multiples of 1 degree are accomplished by setting M=2, 3, etc. It can be thus shown that all settings for swing increments of multiples of 1 degree can be accomplished with only the former two interface settings.

It is noted that when the value chosen for N is 360 and the value for M is 1, the right side of the basic equation discussed above becomes $$\frac{1,999,800}{360}$$

This division yields 5,555, with no remainder. This means that, when the swing increment is an integral multiple of 1 degree, there is no mathematical error in the method at all. Thus, the only error is that associated with the imprecision in manufacturing the machine for implementing the process.

In any event, it is shown that it is possible by means of this invention to represent swing increments of multiples of 1 degree using only two of the interfaces. Thus, if the machine is to be employed primarily in establishing such swing increments, the third, or 101 segment, interface can be omitted, and the spanner remains idle.

Applicants have also devised a method alternate to Procedure I hereinabove, for setting up the interfaces of the machine to approximate the desired swing increment. This method is set forth below, the example using a value of 19 for N and values of 99, 100 and 202 for $D_1$, $D_2$ and $D_3$, respectively.

PROCEDURE II

Constants are denoted with a subscript c; variables particular to the number of teeth the calculations are being done for are denoted by v; calculation results are unmarked.

1. Divide $100_c$ by the number of teeth to be cut. Integer division.
2. Multiply number of teeth to be cut by integer division quotient.
3. Subtract result of step 2 from $100_c$.
4. Divide result of step 3 by $100_c$.
5. Add $100_c$ to result of step 4.
6. Divide result of step 5 by number of teeth to be cut.
7. The calculations above can be set forth as follows:
   $100_c \div 19_v = 5.+$
   $19 \times 5 = 95$
   $100_c - 95 = 5$
   $5 \div 100_c = .05$
   $100_c + .05 = 100.05$
   $100.05 \div 19 = 5.26578947$
8. Take result of Step 6. Set aside digits to left of decimal.
9. Subtract the 5th and 6th decimal digits from the 3rd and 4th.
10. Subtract result of step 9 from $101_c$. Be sure signs are correct. Set aside this result.
11. Divide result of step 10 by $202_c$, and place under result of Step 6.
12. Search mentally for a decimal number that can be added to or subtracted from the result of Step 11 such that the 3rd, 4th, 5th, and 6th decimal places of Step 6 will be obtained. The decimal must repeat every two places. (A multiple of .01010101.) If a decimal can be found that can be added, do so, and set aside the two repeating digits. If the number must be subtracted, then subtract that number from $99_c$ and set that result aside.
13. Study first two digits of result of step 12, and compare them with the two digits to the right of the decimal in the Step 6 result. What is still lacking from the result of Step 12 to make it identical with the first two digits to the right of the decimal in the Step 6 result? If a number must be added, do so, and note the number. If a number must be subtracted, do so, and then subtract that number from $100_c$, and make note of it.
14. Add the numbers set aside in Steps 8 and 13. This is the number to set on the 100 dial of the machine.
15. The result of Step 10 is set on the 202 dial.
16. And, the result of Step 12 is set on the 99 dial.
17. The machine will now cut 19 teeth.

$5.26578947 \qquad 101_c - (57-89) = 133$ $133 \div 202_c = .65841584$ $\begin{array}{l} .65841584 \\ \underline{.26262626} \\ .39578958 \\ \underline{.13} \\ 5.26578958 \end{array} \qquad \begin{array}{l} 99_c - 26 = 73 \\ \\ 100_c - 13 = 87 \end{array}$ $5 + 87 = 92$ "The above are the calculations for steps 8-17."

Table VII, hereinbelow, shows a number of sample results obtained by the use of Procedure II.

In order to demonstrate the remarkable accuracy obtainable by the use of applicants' apparatus and method, there is presented herewith material in tabular form representing the results achieved in a number of exemplary applications.

Table IV illustrates the results obtained when applicants' apparatus is used to cut gears having from 27 to 30 teeth. Set out therein are columns indicating the number of teeth to be cut (N), the swing increment (number M of teeth swung), and the spanner disc setting, using a spanner divided into 100 equal parts. The spanner setting indicates the number of the 100 spanner segments through which the spanner, by means of placing of the spanner pins, is allowed to rotate. Also shown are the number of segments of rotation of the various plates which are used to establish that balance of the swing increment not included in the rotation permitted by the spanner. In this instance, the plates are divided into 202, 99 and 100 nominal segments. The decimal figure indicated under the 100 plate is simply a manifestation of the fact that the 100 plate is divided, actually, into 200 segments. For example, the designation 24.5 under the 100 plate setting indicates that this disc is rotated $$\frac{24.5}{100}, \text{ or } \frac{49}{200}$$

segments.

Also shown in this table is the actual value of the swing increment, expressed as a decimal fraction of a circle, the exact value ideally sought, and the error difference between the two.

Table V illustrates still other examples, and is completely analogous to Table IV, except that Table V illustrates the single step method of approximating the swing increment, i.e., performed without the use of the spanner. The examples of Table IV, on the other hand, showing the use of the spanner, are illustrative of the "two-step" process, described hereinabove.

Table VI is analogous to Tables IV and V but, instead of showing examples of swung increments expressed in terms of the ratio of number of teeth swung to number of teeth cut, illustrate the use of this invention for approximating degrees and minutes. Note that, in the approximation of degrees, it is not necessary to utilize any rotational increment on the 202 plate.

Tables IV through VII are illustrated as follows:

predetermined fraction of a full circle, the denominator of the first predetermined fraction being relatively prime, f. second means movably mounted on the shaft for establishing a second predetermined angular displacement of said shaft about its axis of rotation, the second predetermined angular displacement corresponding to a second predetermined fraction of a full circle which is different from the first, the denominator of the second predetermined fraction being relatively prime, g. means mounted on the first and second means for defining an intermediate predetermined angular displacement of said shaft about its axis of rotation which is equal to the sum of the first predetermined angular displacement and the second predetermined angular displacement, the numerators of the first predetermined fraction and the second predetermined fraction when selected from one of plurality of predetermined combinations thereof enabling one of a plurality of intermediate predetermined angular displacements to be achieved which are used to enable

|  | NO. OF TEETH TO BE CUT (N) | NO. OF TEETH SWUNG(M) | SPANNER SETTING | PLATE SETTINGS 202 | 99 | 100 | VALUE SWUNG | EXACT VALUE | ERROR |
|---|---|---|---|---|---|---|---|---|---|
| TABLE IV | 27 | 5 | 9 | 84 | 43 | 24.5 | .185185018501 | .185185185185 | −.000000166684 |
|  | 28 | 13 | 23 | 94 | 39 | 37.5 | .464285928592 | .464285714285 | +.000000214307 |
|  | 29 | 9 | 15 | 42 | 24 | 71.0 | .310345034503 | .310344827586 | +.000000206917 |
|  | 30 | 7 | 11 | 0 | 33 | 79.0 | .233333333333 | .233333333333 | +.000000000000 |
| TABLE V | 31 | 11 | — | 192 | 43 | 97.0 | .354838483847 | .354838709677 | −.000000225830 |
|  | 32 | 15 | — | 164 | 68 | 97.0 | .468749874986 | .468750000000 | −.000000125014 |
|  | 33 | 7 | — | 0 | 21 | 0.0 | .212121212121 | .212121212121 | +.000000000000 |
|  | 34 | 9 | — | 110 | 51 | 20.5 | .264705970596 | .264705882352 | +.000000088244 |
| TABLE VII | 19 | 6 | 5 | 133 | 73 | 87.0 | .31578957 | .31578947 | +.00000010 |
|  | 20 | 1 | 5 | 101 | 0 | 50.0 | .05000000 | .05000000 | +.00000000 |
|  | 21 | 17 | 4 | 29 | 59 | 3.0 | .80952394 | .80952380 | +.00000014 |
|  | 22 | 13 | 4 | 101 | 9 | 96.0 | .59090909 | .59090909 | +.00000000 |
| TABLE VI | DEGREES 101 |  |  | 0 | 55 | 72.5 | .280555555555 | .280555555555 | +.000000000000 |
|  | 102 |  |  | 0 | 33 | 95.0 | .283333333333 | .283333333333 | +.000000000000 |
|  | 103 |  |  | 0 | 11 | 17.5 | .286111111111 | .286111111111 | +.000000000000 |
|  | 104 |  |  | 0 | 88 | 40.0 | .288888888888 | .288888888888 | +.000000000000 |
|  | MINUTES 13 |  |  | 198 | 4 | 98.0 | .000602060205 | .000601851851 | +.000000208354 |
|  | 14 |  |  | 42 | 27 | 52.0 | .000648064806 | .000648148148 | −.000000083342 |
|  | 15 |  |  | 38 | 75 | 5.5 | .000694569456 | .000694444444 | +.000000125012 |
|  | 16 |  |  | 84 | 98 | 59.5 | .000740574056 | .000740740740 | −.000000166684 |

What is claimed is:

1. Apparatus for successively indexing a workpiece when rotatably mounted by a swing increment into a selected one of a plurality of different arrays of locations, each different array having a plurality of locations relatively spaced at equal intervals from each other about a circle extending about the axis of the rotatably mounted workpiece, the number of locations of each array being different, the apparatus comprising:

a. a support member, b. a shaft rotatably mounted on said support member, c. means mounted on said shaft for removably grasping the workpiece for rotational movement with said shaft, d. means connected to the support member for selectively preventing rotation of said shaft and the workpiece, e. first means movably mounted on the shaft for establishing a first predetermined angular displacement of said shaft about its axis of rotation, the first predetermined angular displacement corresponding to a first a full circle to be divided into a predetermined number of equal segments, h. third means movably mounted on the shaft for establishing a third predetermined angular displacement of the shaft about its axis of rotation, the third predetermined angular displacement corresponding to one of a preselected equal increment of angular displacement of a full circle and being a function of the number of locations to be disposed between successive locations to which the workpiece is indexed, i. additional means mounted on the third means for defining a total predetermined angular displacement of said shaft about its axis of rotation which is equal to the sum of the third predetermined angular displacement and the intermediate predetermined angular displacement, the total predetermined angular displacement including the number of locations to be skipped between locations at which the workpiece is to be indexed; and j. means connected to the support member for controlling the rotation of said shaft through angular displacement of the shaft about its axis of rotation which is equal to the total predetermined angular displacement, whereby the workpiece can be indexed through a precisely governed angular displacement by the swing increment determined by the total predetermined angular displacement.

2. The apparatus of claim 1, in which:
a. said first and second means together comprise a plurality of adjacent plates mounted on said shaft for rotation with respect to said shaft, each said adjacent pair of said plates having a mutual interface concentric with said shaft and having registration means associated with said interface for rendering said each adjacent pair of plates relatively positionable in any of at least one set of equally spaced discrete possible rotational positions, the interval between each adjacent pair of positions of said plates in said one set of said discrete positions being a different fraction of a full circle for each adjacent pair of plates, the denominators of each of said different fractions being relatively prime,
b. said means for defining an intermediate predetermined angular displacement of said shaft comprises means for rotationally fixing said plates with respect to one another when said plates are positioned to establish the first and second predetermined angular displacements, said means for controlling the rotation of said shaft comprises means attached to one of said plates for limiting the degree of rotation of said shaft, said degree of rotation being thereby limited by the angular position of said one of said plates, and
d. said third means comprising an additional plate mounted on said shaft for rotation with respect to said shaft, said additional plate having additional registration means for rendering said additional plate relatively positionable in accordance with the number of locations to be disposed between successive locations to which the workpiece is to be indexed, whereby the swing increment can be established by relatively positioning each of said plates in predetermined relative positions defined by the number of said intervals by which each plate is displaced with respect to its adjacent plates, applying said defining means to rotationally lock said plates and rotating said shaft through the swing increment established by said stop means, said swing increment being equal to the sum of the relative angular displacement between the component surfaces of each of said interfaces.

3. The apparatus of claim 2, in which said registration means comprises:
one set of facing splines on each component side of each said interface, whereby said plates can be locked together in fixed rotational position by pressing the plates toward each other.

4. The apparatus of claim 2, in which said registration means comprises:
a plurality of circular arrays of index holes said arrays being located in at least one of said plates and being concentric with the axis of said shaft, each of said index holes being further capable of accommodating a pin placed therein, whereby the relative positions of the plates can be visually indexed.

5. The apparatus of claim 2, comprising:
said adjacent plates being three in number and having two interfaces the spacing between said positions of each said one set of discrete positions being 1/99th of a circle and 1/200th of a circle, respectively.

6. The apparatus of claim 2, further comprising:
said adjacent plates being four in number and having three interfaces, the spacing between said discrete positions of each said one set of positions being 1/99th, 1/101st and 1/200th of a circle, respectively.

7. The apparatus of claim 1 and further comprising:
a. a disc coaxial with and rotationally fixed to said shaft
b. a block mounted on said support member having a recess extending around a portion of said disc,
c. a threaded member extending through said block into said recess, and
d. a caliper pad pivotally mounted on said threaded member within said recess whereby, when said threaded member is rotated, said caliper pad is pressed against said disc, braking said disc and shaft in a creep-free fashion.

8. The apparatus of claim 3, in which said means for fixing said plates comprises:
a. at least one notch inscribed on the periphery of one of said plurality of adjacent plates,
b. blade means mounted on said support member for removably engaging said blade in said notch
c. a pressure plate mounted on the side of said plates opposite said notched plate, and
d. threaded means to force said pressure plate to press said plates together toward said notched disc.

9. The apparatus of claim 3, in which said splines possess a profile having flat crests and sharp roots.

10. The apparatus of claim 3, in which said registration means further comprises:
an additional set of facing splines on the component sides of one of said interfaces and interspersed with said one set of splines, said one set and said additional set of splines comprising a combined set of splines which are equally spaced in a circular configuration, whereby said combined set of splines provides an interface with a meshing capability better than that of the interface having only said one set of splines.

11. The apparatus of claim 10, in which the number of splines of said additional set is equal to an integral multiple of the number of splines in said one set of splines.

12. The apparatus of claim 2, further comprising:
means for enabling rotation of said shaft including a reciprocating lever and a clamp attached to the lever for releasably mounting the lever on the shaft, the clamp having an opening adapted to extend about the shaft, a ring of elastomeric material disposed about the shaft within the opening of the clamp, and means for tightening the clamp whereby, when said clamp is tightened, said reciprocating lever is fixed to said shaft in a creep-free fashion.

13. The apparatus of claim 1, in which said third means further comprises:
a. a spanner disc concentrically mounted relative to said shaft, said spanner disc having radially extending holes in the edge thereof,
b. spanner pins adapted to be inserted in the holes in accordance with the third predetermined angular displacement; and
c. a spanner stop mounted on said support member, to engage said spanner pins when mounted in said holes, whereby said spanner pins limit the rotation of said shaft by engagement of said spanner pins with said spanner stop.

14. A method for disposing a workpiece for indexing thereof at locations relatively spaced about the workpiece, comprising the steps of:
a. mounting the workpiece on a rotatable shaft,
b. establishing a first predetermined angular displacement of said shaft about its axis of rotation the first predetermined angular displacement corresponding to a first predetermined fraction of a full circle,
c. establishing a second predetermined angular displacement of said shaft about its axis of rotation the second predetermined angular displacement corresponding to a second predetermined fraction of a full circle,
d. defining an intermediate predetermined angular displacement of said shaft about its axis of rotation which is equal to the sum of the first predetermined angular displacement and the second predetermined angular displacement, the denominators of the first predetermined fraction and the second predetermined fraction being relatively prime, the numerators of the first predetermined fraction and the second predetermined fraction when selected from one of a plurality of predetermined combinations thereof enabling one of a plurality of third predetermined angular displacements to be achieved which permit a full circle to be divided into a predetermined number of equal segments,
e. establishing a third predetermined angular displacement of said shaft about its axis of rotation, the third predetermined angular displacement corresponding to one of a preselected equal increment of angular displacement of a full circle and being a function of the number of locations to be disposed between successive locations which the workpiece is indexed,
f. defining a total predetermined angular displacement of said shaft about its axis of rotation which is equal to the sum of the third predetermined angular displacement and the intermediate predetermined angular displacement, the total predetermined angular displacement including the number of locations to be skipped between locations at which the workpiece is to be indexed;
g. rotating said shaft through said total predetermined angular displacement, and
h. indexing the workpiece following said rotation through said total predetermined angular displacement, whereby, by an appropriate selection of the numerators of each of said fractions, any desired swing increment can be at least precisely approximated, thus providing for movement of the workpiece through a precisely governed angular displacement, enabling indexing of the workpiece at intervals defined by the magnitude of the swing increment determined by the total predetermined angular displacement.

15. The method of claim 14, in which:
said total predetermined angular displacement is a swing increment which possesses a magnitude which is an integral multiple M of the final desired rotational spacing between adjacent locations to be indexed on the workpiece, the value for M is chosen in accordance with the relations set forth in Tables I, II and III where N is the number of locations to be indexed, whereby the error in spacing of the locations resulting from any imprecision in establishing the swing increment may be effectively distributed about the plurality of the indices, so as not to allow said error to be accumulated between any two adjacent indices:

Table I

| M | N |
|---|---|
| 4x−1 | 8x |
| 2x+1 | 8x+2 |
| 4x+1 | 8x+4 |
| 2x+1 | 8x+6 | where $x$ takes on values of 0, 1, 2, 3 ... and where N is an even number;

Table II

| N | M |
|---|---|
| 6x+1 | 2x+1 |
| 6x+3 | Special case |
| 6x+5 | 2x+1 | where N is an odd number;

Table III

| Value of N | Optimum Value of M | d', d |
|---|---|---|
| 3 | 1 | −2, 1 |
| 9 | 4 | 7, −2 |
| 15 | 4 | −11, 4 |
| 21 | 8 | −13, 8 |
| 27 | 5 | −16, 11 |
| 33 | 7 | 19 −14 |
| 39 | 16 | 22, −17 |
| 45 | 19 | −26, 19 |
| 51 | 20 | −28, 23 |
| 57 | 11 | −31, 26 |
| 63 | 13 | 34, −29 |
| 69 | 28 | 37, −32 |
| 75 | 11 | 41, −34 |
| 81 | 32 | −43, 38 |
| 87 | 17 | −46, 41 |
| 93 | 19 | 49, −44 |
| 99 | 40 | 52, −47 | where N has values which are odd multiples of 3 and where d' < d and d'+d=N.

* * * * *

UNITED STATES PATENT AND TRADEMARK OFFICE
CERTIFICATE OF CORRECTION

PATENT NO. : 3,908,484
DATED : September 13, 1975
INVENTOR(S) : Frederick I. Degen and Gregory R. Waldron It is certified that error appears in the above-identified patent and that said Letters Patent are hereby corrected as shown below:

Column 1, line 22, change "adjacent holes in" to

--adjacent holes on--.

Column 1, lines 27 and 28, change "number of fineness" to

--number and fineness--.

Column 8, line 32, change "splines" to --splined--.

Column 9, line 21, change "90" to --99--.

Column 11, line 27, after "is" insert --equal to--.

Column 12, line 15, before "form of", change "the" to --this--.

Column 12, line 29, change "result to two factors" to

--result of two factors--.

Column 13, line 25, change "12M/19" to --12/19)M--.

Column 13, line 47, change "N(Z+m)" to --n(Z+m)--.

Column 14, line 5, change "(Z=m)" to --(Z+m)--.

Column 15, line 63, change "consider" to --Consider--.

UNITED STATES PATENT AND TRADEMARK OFFICE
CERTIFICATE OF CORRECTION

PATENT NO. : 3,908,484

DATED : September 13, 1975

INVENTOR(S) : Frederick I. Degen and Gregory R. Waldron

It is certified that error appears in the above-identified patent and that said Letters Patent are hereby corrected as shown below:

Column 15, line 63, before "above" insert --discussed--.

Column 16, line 17, change "n3" to --N3--.

Column 16, line 65, place parenthesis around $X_1-Q$ in equation.

Column 18, line 32, before =-1, insert --$N_2$--.

Column 18, line 40, before "7/19", insert --$=$--.

Column 18, line 49, change "$\approx$" to --$\cong$--.

Signed and Sealed this seventeenth Day of February 1976

[SEAL]

Attest:

RUTH C. MASON
Attesting Officer

C. MARSHALL DANN
Commissioner of Patents and Trademarks